United States Patent
Yetukuri et al.

(10) Patent No.: US 7,210,734 B1
(45) Date of Patent: May 1, 2007

(54) HEAD RESTRAINT MOVEMENT MECHANISM

(75) Inventors: Nagarjun V. Yetukuri, Rochester Hills, MI (US); Mladen Humer, West Bloomfield, MI (US); Gerald S. Locke, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/163,443

(22) Filed: Oct. 19, 2005

(51) Int. Cl.
*A47C 1/02* (2006.01)

(52) U.S. Cl. .................... 297/61; 297/410; 297/378.12

(58) Field of Classification Search ................ 297/61, 297/410, 378.12
See application file for complete search history.

(56) References Cited

U.S. PATENT DOCUMENTS

| | | | |
|---|---|---|---|
| 4,671,573 A | 6/1987 | Nemoto et al. | |
| 5,052,754 A | 10/1991 | Chinomi | |
| 5,071,190 A | 12/1991 | Tame | |
| 5,681,079 A | 10/1997 | Robinson | |
| 5,918,940 A * | 7/1999 | Wakamatsu et al. | ...... 297/61 X |
| 6,074,011 A | 6/2000 | Ptak et al. | |
| 6,192,565 B1 | 2/2001 | Tame | |
| 6,199,947 B1 | 3/2001 | Wiklund | |
| 6,447,068 B1 | 9/2002 | Anderson et al. | |
| 6,709,051 B2 * | 3/2004 | Schambre et al. | ........ 297/61 X |
| 6,779,839 B2 * | 8/2004 | Andreasson et al. | ...... 297/61 X |

* cited by examiner

*Primary Examiner*—Anthony D. Barfield
(74) *Attorney, Agent, or Firm*—Brooks Kushman P.C.

(57) ABSTRACT

A vehicle seat assembly includes a seat bottom and a seat back pivotally attached to the seat bottom. The seat bottom includes a track having a longitudinal track axis. The seat assembly further includes a head restraint moveably attached to the track such that the head restraint is moveable longitudinally along the track from a use position to a stowed position. An actuation device is associated with the head restraint for moving the head restraint from the use position toward the stowed position when the seat back pivots toward the seat bottom.

19 Claims, 4 Drawing Sheets

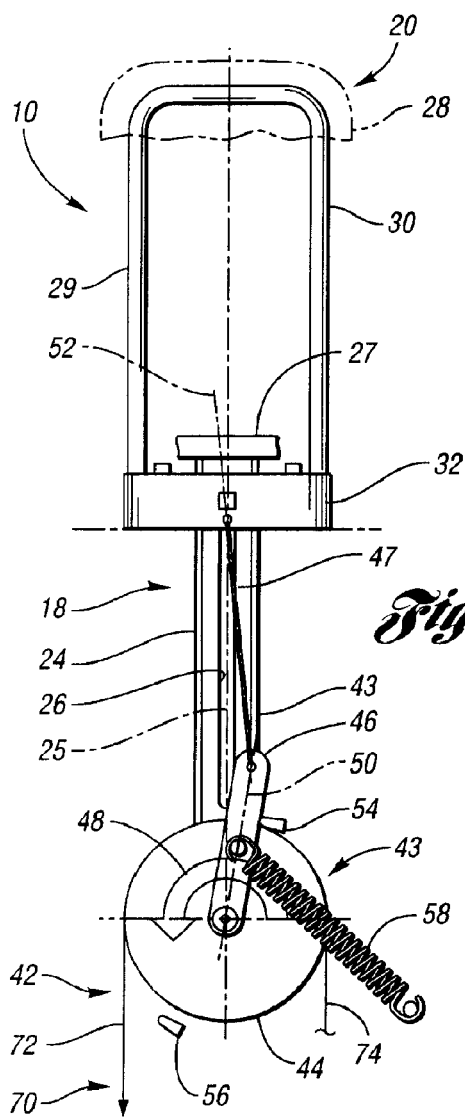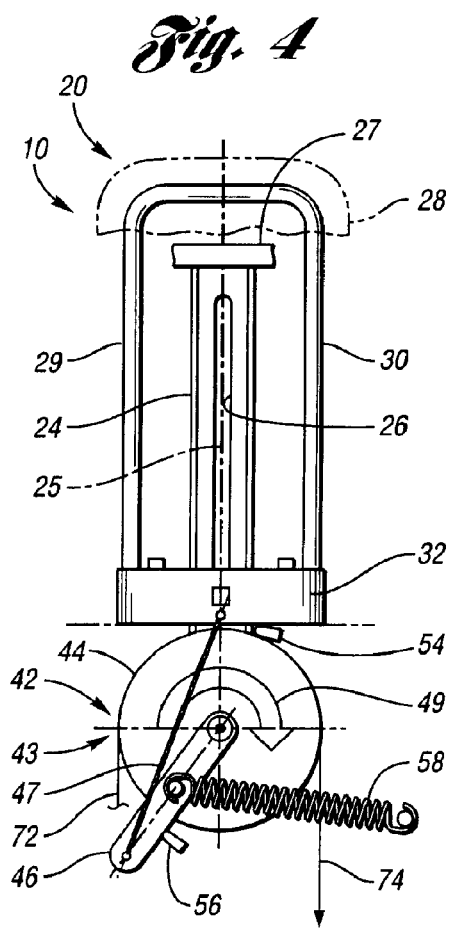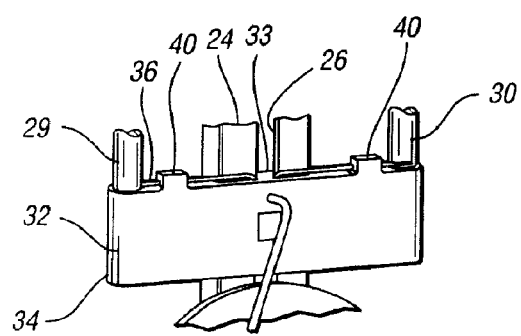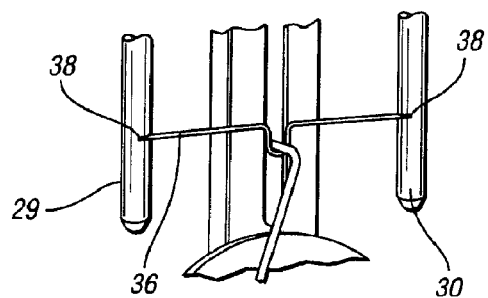
Fig. 3
Fig. 4
Fig. 5
Fig. 6

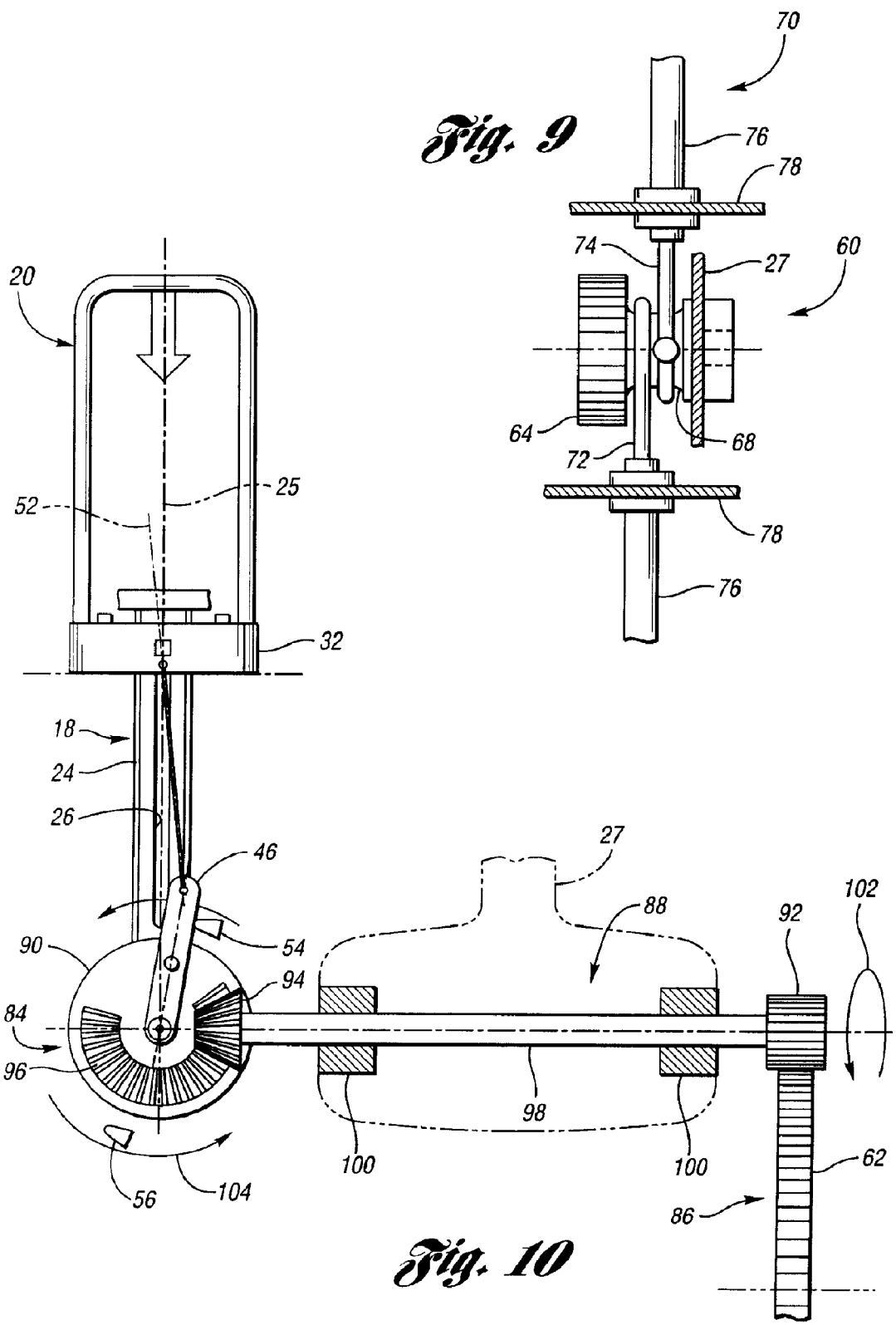

HEAD RESTRAINT MOVEMENT MECHANISM

BACKGROUND OF THE INVENTION

1. Field of the Invention

The invention relates to a seat assembly having a moveable head restraint.

2. Background Art

Vehicle seat assemblies may be provided with moveable head restraints. U.S. Pat. No. 6,192,565, for example, discloses a seat assembly having a retractable head restraint.

SUMMARY OF THE INVENTION

Under the invention, a new seat assembly is provided. In one embodiment, the seat assembly includes a seat bottom and a seat back pivotally attached to the seat bottom. The seat back includes a track having a longitudinal track axis. The seat assembly further includes a head restraint moveably attached to the track such that the head restraint is moveable longitudinally along the track from a use position to a stowed position. An actuation device is associated with the head restraint for moving the head restraint from the use position toward the stowed position when the seat back pivots toward the seat bottom.

In another embodiment, the seat assembly includes a seat bottom and a seat back pivotally attached to the seat bottom. The seat back includes a track having a longitudinal track axis. The seat assembly further includes a head restraint moveably attached to the track such that the head restraint is moveable longitudinally along the track between a use position and a stowed position. An actuation device is associated with the head restraint for moving the head restraint from the stowed position toward the use position when the seat back pivots away from the seat bottom.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 3 is a schematic view of the seat assembly showing an actuation device for moving the head restraint along a track of the seat back, wherein the head restraint is shown in the use position;

FIG. 4 is a schematic view of the seat assembly showing the head restraint in the stowed position;

FIG. 5 is an enlarged perspective view of a portion of the seat assembly showing first and second posts of the head restraint connected to a carrier having a carrier body and a retainer member;

FIG. 6 is an enlarged perspective view similar to FIG. 5 with the carrier body removed to show the retainer member;

FIG. 9 is a rear view of the gear arrangement; and

FIG. 10 is a schematic view of the seat assembly showing a second embodiment of the actuation device.

DETAILED DESCRIPTION

The following description is merely exemplary in nature, and is in no way intended to limit the invention or its application or uses.

Figure 1:
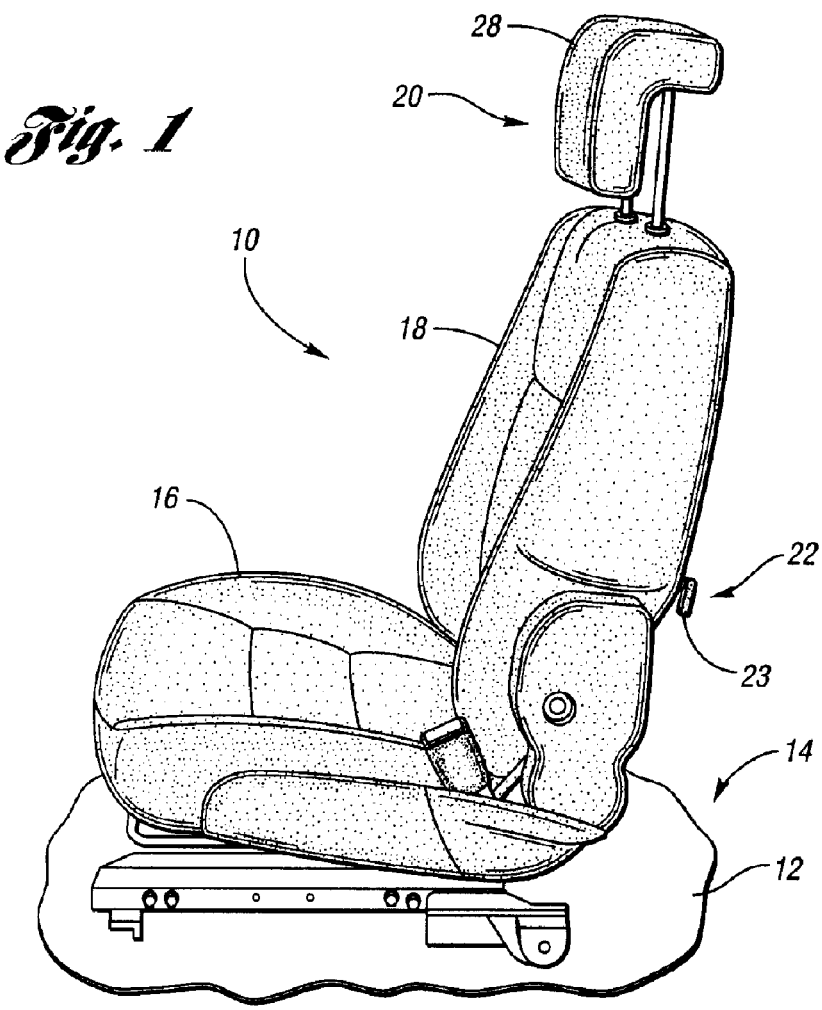
FIG. 1 is a side perspective view of a vehicle seat assembly according to the invention, wherein the seat assembly includes a seat bottom, a seat back pivotally attached to the seat bottom, and a head restraint moveable attached to the seat back, and wherein the seat back is shown in a raised position and the head restraint is shown in a use position.

FIG. 1 shows a vehicle seat assembly 10 according to the invention mounted on a floor 12 of a motor vehicle 14. The seat assembly 10 includes a seat bottom 16 moveably mounted to the floor 12, a seat back 18 pivotally attached to the seat bottom 16, a head restraint 20 moveably attached to the seat back 18, and a dump mechanism 22 for allowing the seat back 18 to pivot with respect to the seat bottom 16.

The dump mechanism 22 may have any suitable configuration for allowing pivotal movement of the seat back 18. For example, the dump mechanism 22 may include a latch (not shown) connected between the seat bottom 16 and seat back 18, a lever 23 for releasing the latch, and a spring (not shown) engaged with the seat back 18 for urging the seat back 18 toward the seat bottom 16 when the latch is released.

As explained below in detail, the head restraint 20 may be automatically moveable from a use position, shown in FIG. 1, to a stowed position, shown in FIG. 2, when the seat back 18 is pivoted from a raised position, shown in FIG. 1, to a stowed or lowered position, shown in FIG. 2. In addition, the head restraint 20 may be automatically moveable from the stowed position to the use position when the seat back 18 is pivoted from the lowered position to the raised position.

Referring to FIG. 3, the seat back 18 includes a longitudinal track 24 having a track axis 25 and a slot 26. In one embodiment, for example, the track 24 may be fixed to a seat back frame 27 of the seat back 18. In another embodiment, the track 24 may be integrally formed with the seat frame 27.

The head restraint 20 includes a head restraint body 28, such as a head restraint cushion, that is configured to support a head of a seat assembly occupant (not shown), first and second support posts 29 and 30, respectively, that support the head restraint body 28, and a post carrier 32 attached to the posts 29 and 30 and moveably attached to the track 24. The carrier 32 may have any suitable configuration such that the head restraint 20 may travel longitudinally along the slot 26 between the use position, shown in FIG. 3, and the stowed position, shown in FIG. 4. For example, referring to FIG. 5, the carrier 32 may have a projection 33 that extends into the slot 26 such that the projection 33 is slidable along the slot 26. In addition, the projection 33 may have a flange portion that slides along a rear portion of the track 24.

While the posts 29 and 30 may be attached to the carrier 32 in any suitable manner, in the embodiment shown in FIGS. 5 and 6, the carrier 32 includes a carrier body 34 having oversized cylindrical holes or tapered holes for receiving the posts 29 and 30, and a retainer member 36, such as a wire, for retaining the posts 29 and 30 in the holes of the carrier body 34. As shown in FIG. 6, the retainer member 36 may engage a notch 38 in each post 29, 30, and the carrier body 34 may include clips 40, shown in FIG. 5, that engage the retainer member 36 to secure the retainer member 36 to the carrier body 34.

The carrier 32 may also be configured to accommodate multiple different head restraint configurations, such as configurations having posts 29 and 30 that are spaced apart at different distances. For example, the carrier body 34 may have multiple holes for accommodating different post spacings. As another example, the carrier body 34 may include first and second portions that may be adjustably spaced apart at different distances.

Still further, the head restraint 20 may be configured such that the head restraint body 28 is moveable with respect to the carrier 32. For example, each post 29 and 30 may include top and bottom portions, and the top portions may be slidably adjustable with respect to the bottom portions.

Returning to FIGS. 3 and 4, the seat assembly 10 further includes an actuation mechanism or device 42 for moving the head restraint 20 with respect to the track 24. While the actuation device 42 may have any suitable configuration, in one embodiment, the actuation device 42 includes a drive mechanism 43 having a rotatable member 44, such as a pulley rotatably coupled to the seat back 18, a crank 46 attached to the rotatable member 44, and a link member 47, such as a link rod or arm, having a first end connected to the crank 46 and a second end connected to the carrier 32. In the embodiment shown in FIGS. 3 and 4, the crank 46 is rotatable with the rotatable member 44, and may be considered part of the rotatable member 44. When the rotatable member 44 is rotated in a first direction 48, such as counterclockwise, the head restraint 20 may be moved generally linearly from the use position shown in FIG. 3 to the stowed position shown in FIG. 4. Furthermore, when the rotatable member 44 is rotated in a second direction 49, such as clockwise, the head restraint 20 may be moved from the stowed position shown in FIG. 4 to the use position shown in FIG. 3. Thus, the link member 47 is configured to transfer rotational motion of the rotatable member 44 into linear motion of the head restraint 20.

When the head restraint 20 is in the use position, the crank 46 is rotated past a generally vertical position such that a crank axis 50 of the crank 46 and a link member axis 52 of the link member 47 each extend at an angle with respect to the track axis 25 of the track 24, as shown in FIG. 3. With such a configuration, the crank 46 is moved "over-center" to maintain the head restraint 20 in the use position even with application of a downward force on the head restraint 20. For example, the crank axis 50 may extend at an angle greater than 0 degrees, such as an angle of at least 2 degrees, with respect to the track axis 25.

The seat back 18 may further include first and second stops 54 and 56, respectively, that are engageable with the rotatable member 44 and/or crank 46 to inhibit movement of the rotatable member 44 in the second and first directions, respectively. The stops 54 and 56 may be attached to the seat back frame 27 with a bracket (not shown), for example.

In addition, the seat assembly 10 may also include a spring member 58 for urging the rotatable member 44 and/or crank 46 against either the first stop 54 or the second stop 56, depending on the location of the head restraint 20. As a result, the spring member 58 may be configured to inhibit movement of the head restraint 20 when the head restraint 20 is in either the use position, shown in FIG. 3, or the stowed position, shown in FIG. 4.

Referring to FIGS. 3, 4, 7 and 8, the actuation device 42 further includes a gear arrangement 60 coupled to the rotatable member 44 for rotating the rotatable member 44. The gear arrangement 60 includes an engagement member 62, such as a sector gear, attached to the seat bottom 16, and a gear 64 that is attached to the seat back 18 and engageable with the engagement member 62. For example, the engagement member 62 may be attached to seat bottom frame 66, and the gear 64 may be rotatably attached to the seat back frame 27.

Referring to FIG. 9, the gear arrangement 60 further includes a pulley 68 connected to the gear 64, and a connector arrangement 70 for connecting the pulley 68 to the rotatable member 44. The connector arrangement 70 may have any suitable configuration that causes the rotatable member 44 to rotate when the pulley 68 rotates. For example, the connector arrangement 70 may include first and second cables 72 and 74, respectively, that are each connected to the rotatable member 44 and the pulley 68. Each cable 72 and 74 may also be provided with a surrounding conduit or guide 76 that is attached to the seat back frame 27 with a bracket 78. As another example, the connector arrangement 70 may include a single cable having first and second portions that each extend between the rotatable member 44 and the pulley 68.

The gear 64 is configured to rotate in a first gear direction 80 when the seat back 18 pivots toward the seat bottom 16, thereby causing the first cable 72 to at least partially wrap around the pulley 68. As a result, the first cable 72 causes the rotatable member 44 to rotate in the first direction 48 (shown in FIG. 3), which causes the head restraint body 28 to move from the use position shown in FIGS. 1 and 3 to the stowed position shown in FIGS. 2 and 4.

Likewise, the gear 64 is configured to rotate in a second gear direction 82 when the seat back 18 pivots away from the seat bottom 16, thereby causing the second cable 74 to at least partially wrap around the pulley 68. As a result, the second cable 74 causes the rotatable member 44 to rotate in the second direction 49 (shown in FIG. 4), which causes the head restraint body 28 to move from the stowed position shown in FIGS. 2 and 4 to the use position shown in FIGS. 1 and 3.

Figure 2:
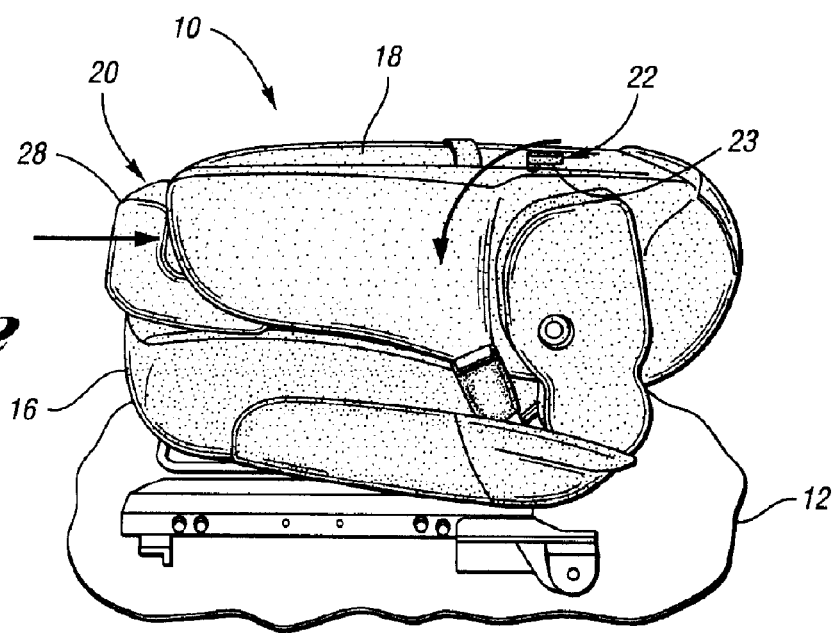
FIG. 2 is a side perspective view of the seat assembly of FIG. 1, showing the seat back in a dumped or lowered position and the head restraint in a stowed position.
Figure 7:
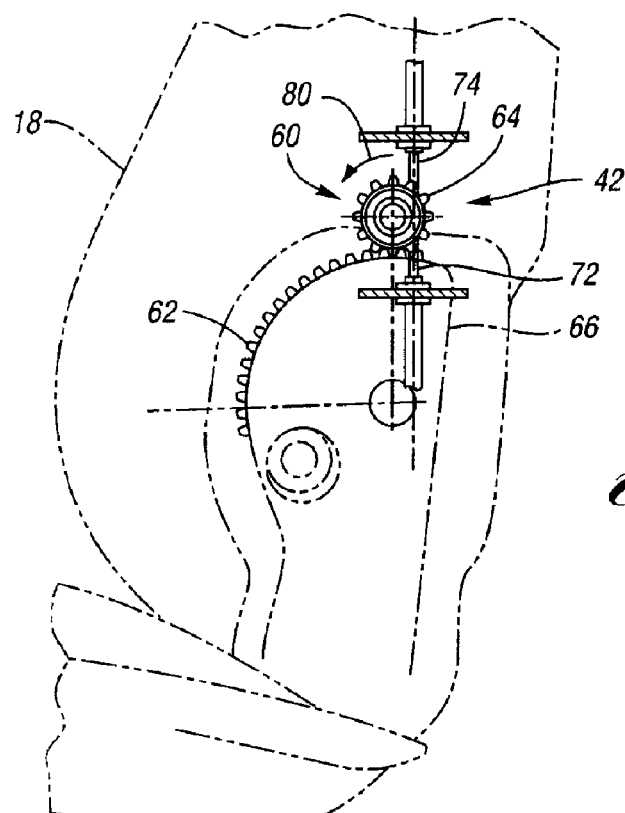
FIG. 7 is a schematic view of a portion of the seat assembly showing a gear arrangement of the actuation device, wherein the seat back is shown in the raised position and a gear of the gear arrangement is shown in a first position.
Figure 8:
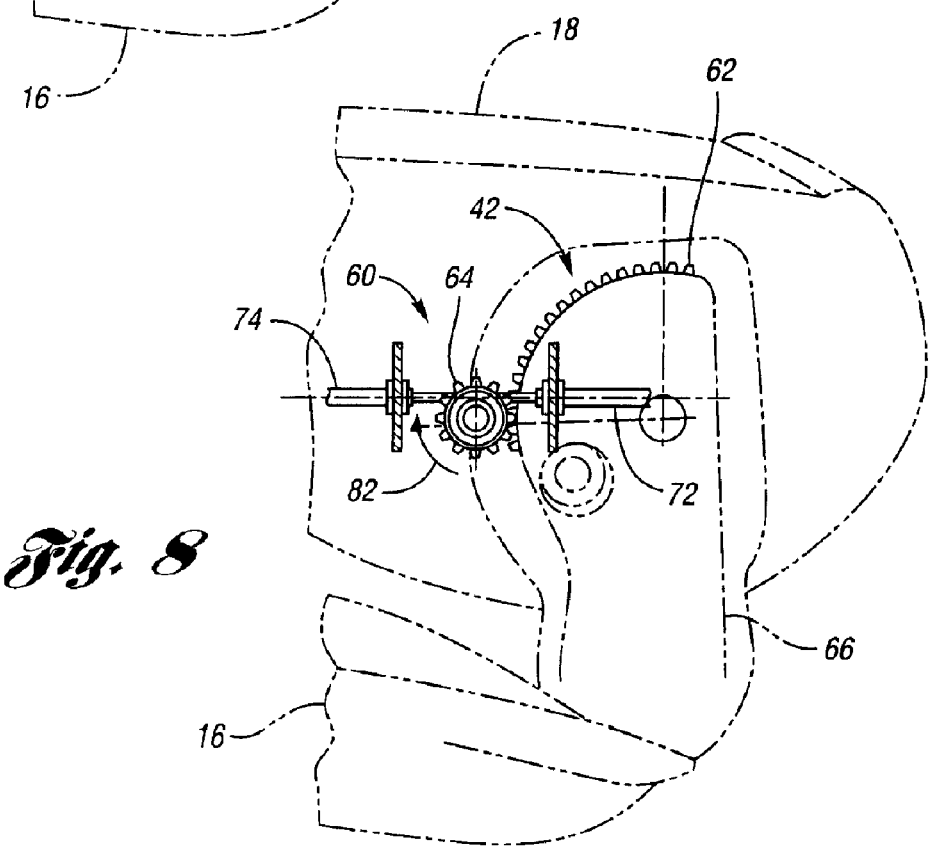
FIG. 8 is a schematic view similar to FIG. 7 and showing the seat back in the lowered position and the gear in a second position.

With the above configuration, the head restraint 20 may automatically move from the use position shown in FIG. 1 to the stowed position shown in FIG. 2 when the seat back 18 is pivoted toward the seat bottom 16 using the dump mechanism 22. Furthermore, the head restraint 20 may automatically move from the stowed position shown in FIG. 2 to the use position shown in FIG. 1 when the seat back 18 is manually pivoted away from the seat bottom 16.

Alternatively, one of the cables 72 and 74 may be eliminated, and the head restraint 20 may be moved manually from one position to another. For example, the first cable 72 may be eliminated, and the head restraint 20 may be moved from the use position to the stowed position by manually pushing on the head restraint 20. As another example, the second cable 74 may be eliminated, and the head restraint 20 may be moved from the stowed position to the use position by manually pushing or pulling on the head restraint 20.

While the head restraint body 28 may have any suitable configuration, in the embodiment shown in FIGS. 1 and 2, the head restraint body 28 has a generally L-shaped configuration. With such a configuration, the head restraint body 28 may nest with the seat back 18 when the head restraint 20 is in the stowed position.

Because the drive mechanism 43 may be configured to maintain the head restraint 20 in the use position, as described above in detail, the drive mechanism 43 may act as a locking mechanism for inhibiting downward movement of the head restraint 20. Furthermore, the gear arrangement 60 may be considered a release mechanism for moving the drive mechanism 43 from the locked position.

Referring to FIG. 10, a second embodiment 84 of the actuation device is shown for moving the head restraint 20 along the track 24. The actuation device 84 is similar to the actuation device 42, and similar components are identified with the same reference numbers. Actuation device 84, however, includes a gear arrangement 86 having a shaft 88 for rotating rotatable member 90. The Shaft 88 includes a first gear, such as a spur gear 92, that is engageable with engagement member 62, and a second gear, such as a pinion 94, that engages a gear 96 formed on, or otherwise connected to, the rotatable member 90.

Shaft portion 98 of shaft 88 may be supported in any suitable manner such that the shaft 88 is rotatable with respect to the seat back 18. For example, shaft portion 98 may be supported by one or more bearings 100 connected to seat back frame 27.

When the seat back 18 is pivoted, the spur gear 92 rotates about the engagement member 62, thereby causing the pinion 94 to rotate the rotatable member 90, which causes the head restraint 20 to move with respect to the track 24. For example, referring to FIGS. 2 and 10, when the seat back 18 pivots toward the seat bottom 16, the spur gear 92 may rotate in a first gear direction 102, which causes the rotatable member 90 to rotate in a first rotatable member direction 104, thereby moving the head restraint 20 from the use position shown in FIG. 10 to the stowed position shown in FIG. 2. Likewise, when the seat back 18 is pivoted away from the seat bottom 16, rotation of the shaft 88 causes the head restraint 20 to move from the stowed position shown in FIG. 2 to the use position shown in FIG. 10.

A spring member, similar to the spring member 58 described above, may also be provided for urging the rotatable member 90 and/or crank 46 against either first stop 54 or second stop 56, depending on the location of the head restraint 20. In order to clearly show details of actuation device 84, however, such a spring member is not shown in FIG. 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
a seat bottom;
a seat back pivotally attached to the seat bottom and including a track having a longitudinal track axis;
a head restraint moveably attached to the track such that the head restraint is moveable longitudinally along the track from a use position to a stowed position; and
an actuation device associated with the head restraint for moving the head restraint from the use position toward the stowed position when the seat back pivots toward the seat bottom, the actuation device including a rotatable member and a link rod having a first end coupled to the rotatable member and a second end coupled to the head restraint, the link rod being configured to transfer rotational motion of the rotatable member into linear motion of the head restraint, an engagement member connected to the seat bottom, and a gear connected to the seat back, the gear being configured to engage the engagement member and rotate as the seat back pivots with respect to the seat bottom, thereby causing the head restraint to move from the use position toward the stowed position.

2. The seat assembly of claim 1 wherein the track includes a longitudinal slot, and the head restraint is moveable along the slot.

3. The seat of claim 1 wherein the rotatable member is configured to rotate in a first direction when the seat back pivots toward the seat bottom to thereby cause the head restraint to move from the use position to the stowed position.

4. The seat assembly of claim 3 wherein the link rod has an axis that extends at an angle with respect to the track axis when the head restraint is in the use position and the link rod is in a locked position.

5. The seat assembly of claim 3 wherein the rotatable member rotates about an axis that is generally aligned with the track axis and generally perpendicular to the track axis.

6. The seat assembly of claim 3 wherein the link rod is pivotally coupled to the head restraint and pivotally coupled to the rotatable member.

7. The seat assembly of claim 1 wherein the actuation device further includes a pulley connected to the gear, and a cable associated with the head restraint and the pulley, and wherein the cable is configured to wrap at least partially around the pulley when the seat back pivots with respect to the seat bottom to thereby cause the head restraint to move from the use position toward the stowed position.

8. The seat assembly of claim 1 wherein the actuation device further comprises a shaft disposed between the engagement member and the head restraint, the shaft including the gear.

9. The seat assembly of claim 8 wherein the rotatable member is coupled to the shaft and wherein the shaft is configured to rotate in a first direction when the seat back pivots toward the seat bottom to thereby cause the rotatable member to rotate in a first rotatable member direction, which causes the head restraint to move from the use position toward the stowed position.

10. The seat assembly of claim 1 further comprising a spring member associated with the head restraint, wherein the spring member is configured to inhibit movement of the head restraint when the head restraint is in the use position, and wherein the spring member is further configured to inhibit movement of the head restraint when the head restraint is in the stowed position.

11. The seat assembly of claim 1 wherein the head restraint includes a head restraint body that is configured to support a head of seat assembly occupant, and wherein the head restraint body has a generally L-shaped configuration that nests with the seat back when the head restraint is in the stowed position.

12. The seat assembly of claim 1 wherein the actuation device is configured to automatically move the head restraint from the stowed position toward the use position when the seat back pivots away from the seat bottom.

13. A vehicle seat assembly comprising:
a seat bottom;
a seat back pivotally attached to the seat bottom and including a track having a longitudinal track axis;
a head restraint moveably attached to the track such that the head restraint is moveable longitudinally along the track between a use position and a stowed position; and
an actuation device associated with the head restraint for moving the head restraint from the stowed position toward the use position when the seat back pivots away from the seat bottom, the actuation device including a rotatable member and a link rod having a first end coupled to the rotatable member and a second end coupled to the head restraint, the link rod being configured to transfer rotational motion of the rotatable member into linear motion of the head restraint, an engagement member connected to the seat bottom, and a gear connected to the seat back, the gear being configured to engage the engagement member and rotate as the seat back pivots with respect to the seat bottom, thereby causing the head restraint to move from the use position toward the stowed position.

14. The seat assembly of claim 13 wherein the track includes a longitudinal slot, and the head restraint is moveable along the slot.

15. A vehicle seat assembly comprising:

a seat bottom;

a seat back pivotally attached to the seat bottom and including a track having a longitudinal track axis;

a head restraint having a carrier and a head restraint body supported by the carrier, wherein the carrier is moveably attached to the track such that the carrier is moveable longitudinally along the track to thereby move the head restraint body between a use position and a stowed position;

a drive mechanism associated with the head restraint for moving the head restraint body from the use position to the stowed position when the seat back pivots toward the seat bottom, wherein the drive mechanism includes a rotatable member associated with the seat back, and a link member having a first end pivotally coupled to the rotatable member and a second end pivotally coupled to the carrier, the link rod being configured to transfer rotational motion of the rotatable member into linear motion of the head restraint body; and a gear arrangement associated with the drive mechanism for rotating the rotatable member, the gear arrangement including an engagement member attached to the seat bottom, and a gear coupled to the seat back and being engageable with the engagement member, wherein the gear is configured to rotate in a first gear direction when the seat back pivots toward the seat bottom, thereby causing the rotatable member to rotate in a first rotatable member direction, which causes the head restraint body to move from the use position toward the stowed position, and wherein the gear is configured to rotate in a second gear direction when the seat back pivots away from the seat bottom, thereby causing the rotatable member to rotate in a second rotatable member direction, which causes the head restraint body to move from the stowed position toward the use position.

16. The seat assembly of claim 15 further comprising a spring member connected to the rotatable member, wherein the spring member is configured to inhibit movement of the head restraint body when the head restraint body is in the use position, and wherein the spring member is further configured to inhibit movement of the head restraint body when the head restraint body is in the stowed position.

17. The seat assembly of claim 15 wherein the head restraint body has a generally L-shaped configuration that nests with the seat back when the head restraint is in the stowed position.

18. The seat assembly of claim 15 wherein the gear arrangement includes a pulley connected to the gear, and a cable associated with the rotatable member and the pulley, and wherein the cable is configured to wrap at least partially around the pulley when the seat back pivots with respect to the seat bottom to thereby cause the head restraint to move with respect to the seat back.

19. The seat assembly of claim 15 wherein the gear arrangement further comprises a shaft disposed between the engagement member and the rotatable member, the shaft including the gear.

* * * * *